March 27, 1962 E. A. LEVIN ET AL 3,027,072

PERFORATED TAPE DATA READER

Filed Oct. 5, 1959 4 Sheets-Sheet 1

INVENTORS
KEITH L. FENDER
EUGENE A. LEVIN

BY

Mellin and Hanscom

ATTORNEYS

March 27, 1962 E. A. LEVIN ET AL 3,027,072

PERFORATED TAPE DATA READER

Filed Oct. 5, 1959 4 Sheets-Sheet 2

INVENTORS
KEITH L. FENDER
EUGENE A. LEVIN

BY

Mellin and Hanscom

ATTORNEYS

INVENTORS
KEITH L. FENDER
EUGENE A. LEVIN
BY
Mellin and Hanscom
ATTORNEYS

March 27, 1962 E. A. LEVIN ET AL 3,027,072

PERFORATED TAPE DATA READER

Filed Oct. 5, 1959 4 Sheets-Sheet 4

INVENTORS
KEITH L. FENDER
EUGENE A. LEVIN
BY
Mellin and Hanscom
ATTORNEYS

United States Patent Office 3,027,072

Patented Mar. 27, 1962

3,027,072

PERFORATED TAPE DATA READER

Eugene A. Levin and Keith L. Fender, Seattle, Wash., assignors to Tally Register Corporation, Seattle, Wash., a corporation of Washington Filed Oct. 5, 1959, Ser. No. 844,395
4 Claims. (Cl. 235—61.11)

This invention relates to devices for reading perforated data on punched tape, and has for its primary object the provision of a novel bi-directional asychronous paper-tape reader designed for use with any standard perforated tape having parallel rows of sprocket holes and data perforations.

Another object of the invention is to provide a perforated data reader in which the true and complementary values of data may be read simultaneously.

Yet another object of the invention is to provide a tape reader in which a single pulse can read the data perforations and can advance the tape to its next position.

Another object of the invention is to provide a tape reader having means to advance the tape incrementally, bringing the tape to a stop after each step with the tape being then in position to be read and moved in either direction as desired.

A further object is to provide a perforated data reader in which sensing switches operate only when a change is made from a hole to a no-hole position or vice versa, and in which this switch operation occurs only on de-energized circuits.

Other objects and advantages will become apparent in the course of the following detailed description.

In the drawings, forming a part of this application, and in which like parts are represented by like reference numerals throughout the same, FIG. 1 is a front elevational view of a tape reading device constructed in accordance with the invention.

Figure 3:
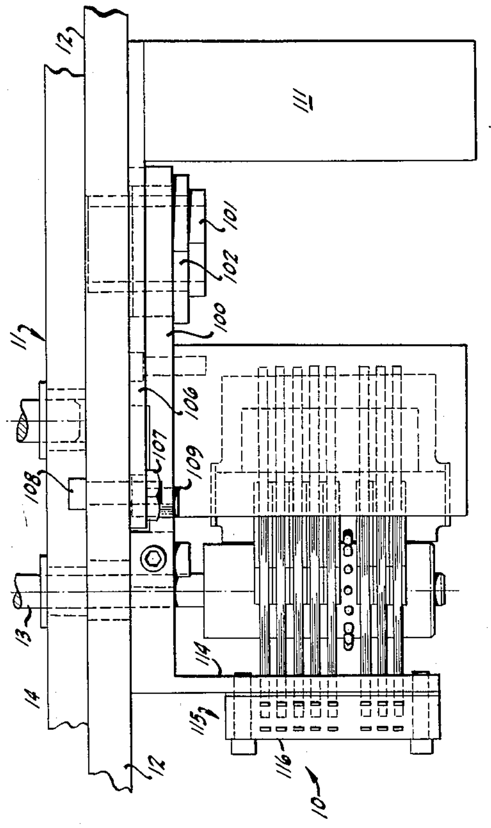
FIG. 3 is a plan view of the tape reading mechanism of FIG. 1.

Referring now to the drawings, the tape reading device comprises a read head unit 10 and a drive mechanism 11, both mounted on a vertical panel 12. The panel 12 may be of any size and may be used as a common panel for other tape or card handling mechanisms, as desired.

The drive mechanism 11 includes an output shaft 13 journaled in frame 14. A spider bevel gear 15 is freely mounted on spider shaft 16 which is fixed to collar 17 clamped to the output shaft 13 by screw 18. Escapement wheel members 19 and 20, mounted on output shaft 13 on either side of spider shaft 16, have bevel gears 21 and 22 formed integrally respectively therewith in mesh with the spider bevel gear 15. The escapement wheel members 19 and 20 are not pinned or keyed to the output shaft 13 in any manner, but are free to rotate thereon.

Figure 4:
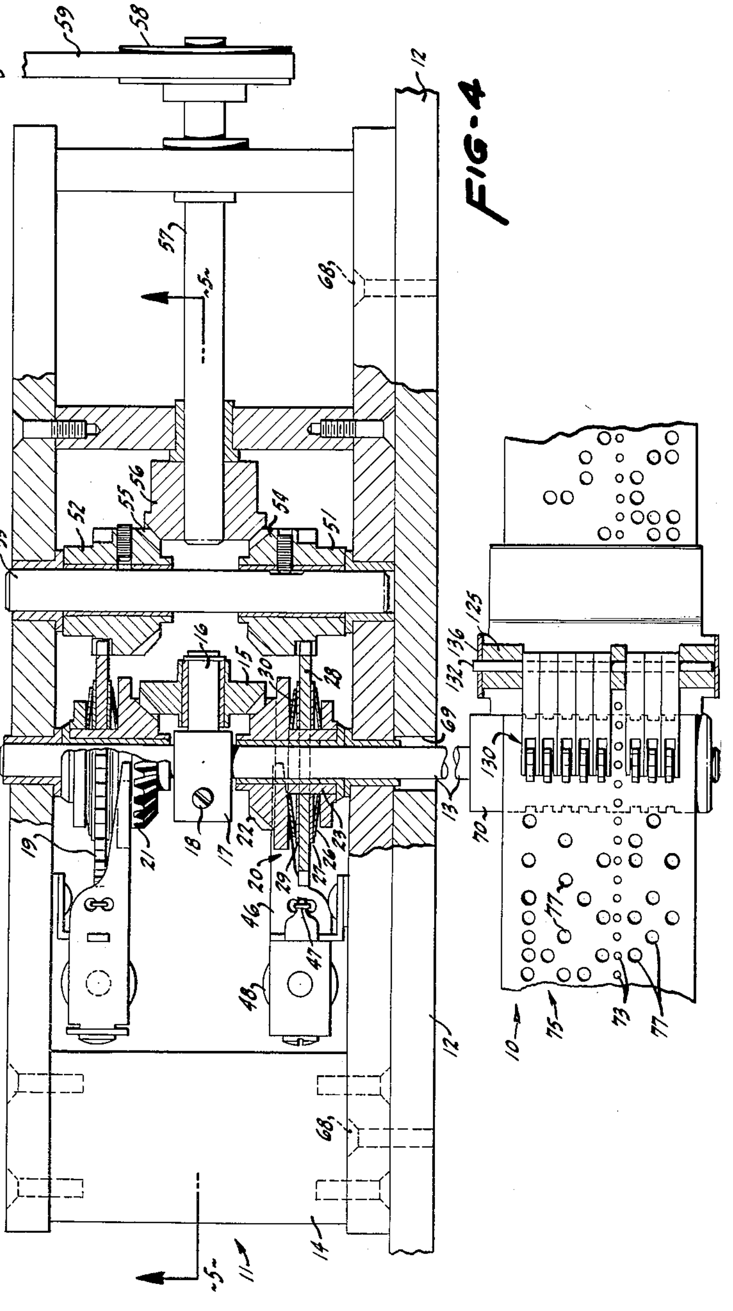
FIG. 4 is a sectional view, taken on line 4—4 of FIG. 1, illustrating the details of the bi-directional drive mechanism.

As seen in FIG. 4, the escapement wheel member 20 has a hub 23 integral therewith. Disposed on the hub, in order, are a spring washer 26, a fiber washer 27, a drive gear 28, a fiber washer 29 and a spring washer 30. Keys (not illustrated) on the spring washers 26 and 30 and the fiber washers 27 and 29 are received within a key groove (not illustrated) on hub 23 to prevent relative rotation therebetween. The drive gear 28 is not keyed to hub 23 but is free to rotate thereon.

When assembled on the hub 23, the fiber washers 27 and 29, acting as friction discs, are squeezed against the drive gear 28 by the spring washers 26 and 30 to provide an impositive friction drive between the drive gear 28 and the escapement wheel 20. If the escapement wheel is free to rotate, the frictional engagement between the friction discs 27 and 29 and drive gear 28 will cause the escapement wheel to rotate in unison with the drive gear. However, if the escapement wheel is held against rotation, the impositive connection between the friction discs and the drive gear will allow the drive gear to continue its rotation on hub 23 without imparting rotative movement to the escapement wheel.

The escapement wheel 19 is provided with ten equally spaced escapement or ratchet teeth 35 around the periphery thereof. A pallet lever 36, pivoted at 37 to bracket 38 secured to frame 14, is biased by spring 39 so that the outer end 40 of the pallet lever engages one of the escapement teeth 35 to normally restrain rotation of the escapement wheel by drive gear 28. Electromagnet 41, mounted on bracket 38, has its pole piece 42 positioned to attract pallet lever 36 upon energization of the electromagnet to cause the pallet lever to pivot out of holding engagement with the escapement teeth of the escapement wheel 19. Such release will allow the escapement wheel to be rotated by the drive gear 45. De-energization of the magnet 41 will allow the pallet lever 36 to pivot back into stopping engagement with the escapement wheel.

Escapement wheel 20 is similarly constructed. Pallet lever 46 is operable by spring 47 and electromagnet 48 to pivot into and out of engagement with the ten ratchet teeth 49 on escapement wheel 20, as described above.

The drive gears 28 and 45 are in mesh with gear clusters 51 and 52 mounted on shaft 53 journaled in frame 14. Gear clusters 51 and 52 have bevel gears 54 and 55, respectively, integral therewith in mesh with drive gear 56 fixed on input shaft 57 journaled in frame 14. The pulley 58 fixed on input shaft 57 is driven at a constant unidirectional rate by belt 59 driven by a motor illustrated schematically at 60.

As is seen in FIG. 4, the drive gear 56, driven by motor 60, rotates the gear clusters 51 and 52 in opposite directions on shaft 53 and at the same rotational speeds. In turn, the drive gears 28 and 45 are rotated at equal speeds in opposite directions coaxially to the output shaft 11.

Figure 10:
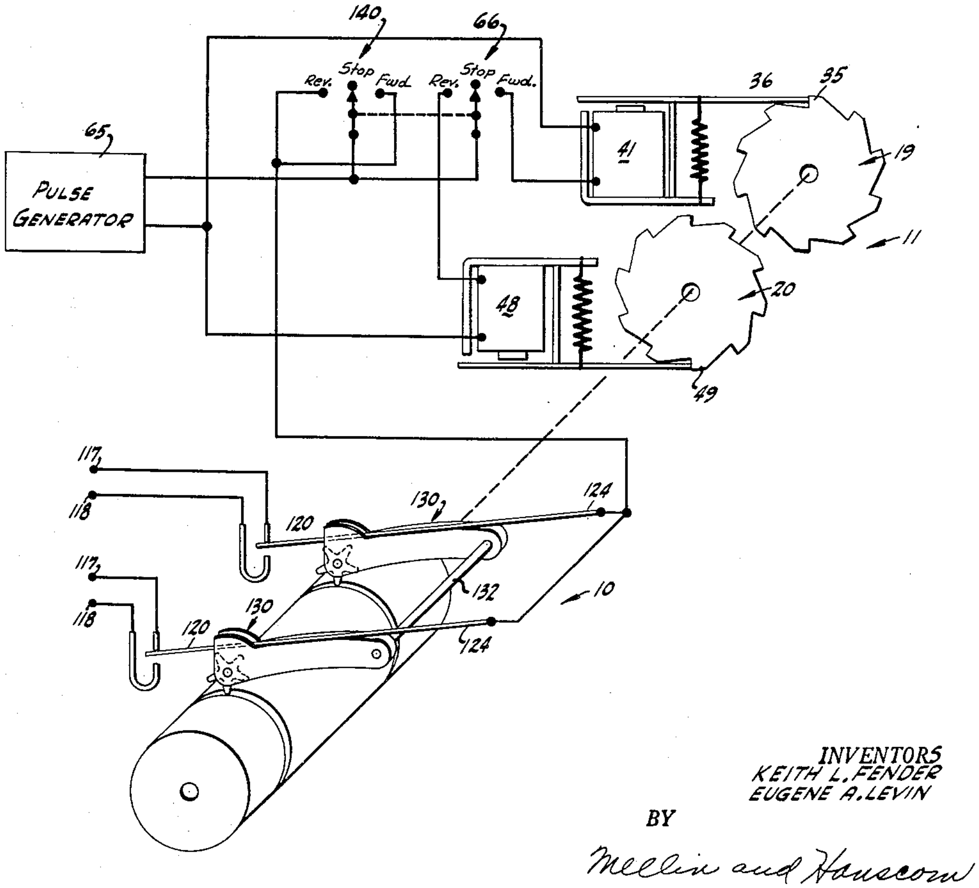
FIG. 10 is a circuit diagram illustrating the manner in which the drive mechanism and tape reading components are operated from a single pulse source.

An electrical circuit for the operation of the drive mechanism 11 is illustrated in FIG. 10. The output of the electrical pulse generator 65 may be connected to either electromagnet 41 or 48 by means of switch 66. Switch 66 has three positions, as illustrated in FIG. 10, "Stop," "Forward" and "Reverse." When switch 66 is in the "Forward" position, electrical pulses will be applied from the pulse generator 65 to the electromagnet 41. When switch 66 is in the "Reverse" position, pulses will be applied to electromagnet 48, and when switch 66 is in the "Stop" position, no pulses will be applied to either electromagnet.

The details of the pulse generator 65 have not been illustrated, as the particular details form no part of the invention. Any pulse generator may be used, as long as it will produce electrical pulses of sufficient voltage and of sufficient duration to energize the magnets 41 and 48 to attract the pallet lever associated therewith and with the pulses being spaced from one another, as discussed below.

In one operating model of the invention, the electromagnets 41 and 48 require a 50-volt pulse of 4–5 milliseconds' duration for energization, and the pallet levers will move out of engagement with the escapement teeth approximately 2 milliseconds after the leading edge of an energizing pulse has been applied by the pulse generator to an electromagnet. The motor 60 rotates the drive gears 28 and 45 at 7.2 revolutions per second, so that when one of the pallet levers is out of engagement with the escapement wheel associated therewith, the escapement wheel will rotate through a one tooth advance in about 14 milliseconds. Thus, a total time of about 16 milliseconds is required from the leading edge of the energizing pulse until the escapement wheel rotates through a single tooth advance. With an energizing pulse of approximately 4–5 milliseconds generated by the pulse generator 65, the pallet lever will have been moved back into stopping engagement with the escapement wheel and will arrest movement thereof at the end of the one tooth advance. The escapement wheel will remain at rest until another pulse is applied to the electromagnet.

From the above, it is apparent that for the escapement wheel to come to rest after a one tooth advance thereof, it is necessary that the length of time between the leading edges of consecutive pulses be greater than 16 milliseconds. To meet this requirement, a pulse generator operating at 60 cycles per second may be used, since the time between cycles is 16.7 milliseconds. Obviously, any pulse generator having a repetition rate less than 60 cycles per second may be used, if desired. Furthermore, the pulse generator can have a random repetition rate, as long at the time between the leading edges of any two consecutive pulses is greater than the 16 milliseconds.

It is to be realized, of course, that the above figures are illustrative of operation only, and are not to be considered as the only condition of operation possible. The feature of criticality is that for a selected speed of rotation of the drive gears 28 and 45, the length of time between the leading edges of consecutive pulses applied to the magnets 41 and 48 must be greater than the time required for an escapement wheel to rotate through a one tooth advance after the energization of a magnet to release the escapement wheel for rotation.

If it is desired to rotate the drive shaft 13 in a forward direction, switch 66 is switched to the "Forward" position, applying a pulse to electromagnet 41. Pallet lever 36 is moved out of engagement with escapement wheel 19, allowing this wheel to be rotated by the frictional engagement of friction discs 27 and 29 with drive gear 28. The rotation of the bevel gear 21 thereon causes the spider bevel gear 15 to rotate about spider shaft 16. Since bevel gear 22 on escapement wheel 20 is locked against rotation by pallet lever 46, the spider shaft 16 rotates about the axis of the output shaft 13. But, since the spider shaft is clamped to the output shaft, the output shaft will itself rotate, in a direction indicated in FIG. 10.

As the escapement wheel 19 rotates through a one tooth advance, the next escapement tooth comes into engagement with the pallet lever 36 and the escapement wheel 19 and output shaft 13 come to rest. The parts will now remain in this position until the next pulse is applied to electromagnet 41, at which time the preceding operation will re-occur. As is obvious, this operation will be the same regardless of the length of time between the stopping of the escapement wheel and the application of the next pulse, and thus the rotation of the output shaft is synchronized with the pulse repetition rate. The step by step advance of the output shaft will continue as long as the switch 66 is in the "Forward" position and pulses are applied to the magnet 41.

If at any time it is desired to reverse the rotation of the output shaft, the switch 66 is merely moved to the "Reverse" position. Pulses will now be applied to magnet 48 to release escapement wheel 20 for incremental advance. As described above, the incremental advance rotates spider bevel gear 15 about spider shaft 16, and causes the spider shaft to rotate the output shaft in a reverse direction.

Since the output shaft and the escapement wheels come to a full stop after every incremental advance, it is obvious that the forces acting on the drive mechanism on the next rotation of the output shaft will be equal, regardless of the direction of rotation. Because of this, the first of two consecutive pulses can be used to rotate the output shaft in one direction, and the second pulse can then be used to reverse the rotation of the output shaft. Such a feature has obvious advantages in that no time is required to slow down the operation before a direction reversal of the output shaft can be obtained.

Due to the gearing between the bevel gears 21 and 22 and the spider gear 15, the output shaft 13 rotates through $\frac{1}{20}$ of a rotation upon a one tooth advance of one of the escapement wheels 28 or 45.

The drive mechanism frame 14 is mounted, as by screws 68, on panel 12, so that the output shaft 13 projects through panel opening 69. A cylindrical drive capstan 70 is secured to shaft 13 for rotation therewith by setscrew 71.

Figures 1, 2:
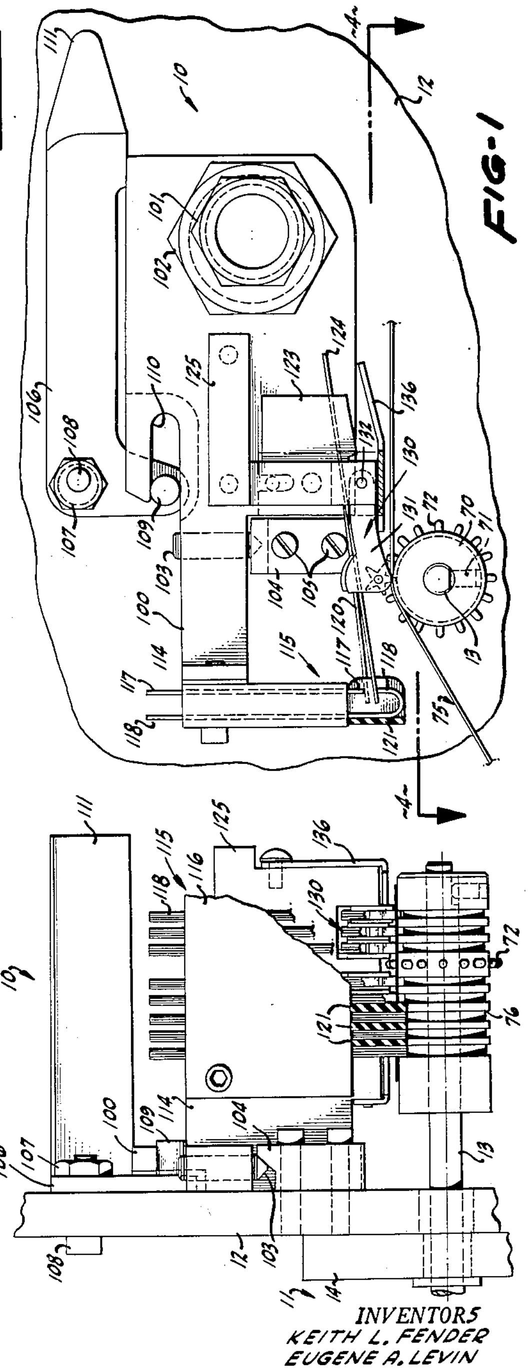
FIG. 2 is a side view of the device shown in FIG. 1, with parts shown in elevation and with parts broken away.
Figure 5:
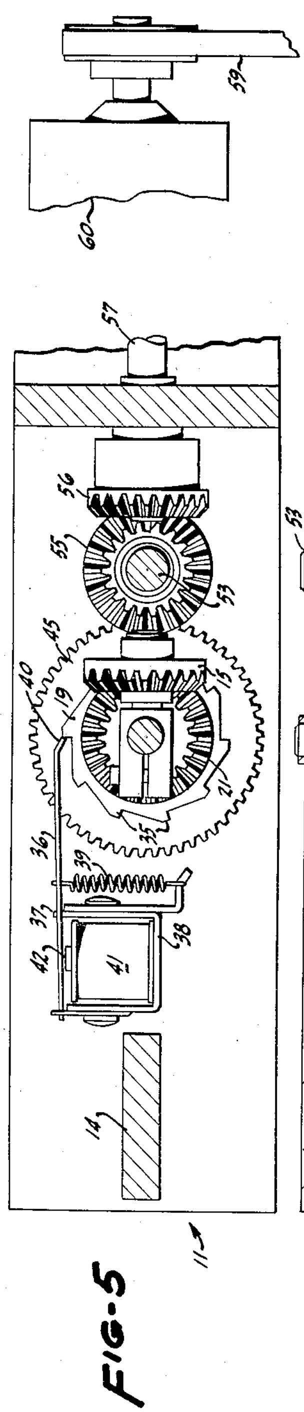
FIG. 5 is a sectional view of the drive mechanism, taken on line 5—5 of FIG. 4.

As best seen in FIG. 2, capstan 70 has a plurality of sprocket pins 72 spaced peripherally therearound for engagement with the sprocket holes 73 of a perforated data tape 75. There are 20 sprocket pins 72 on capstan 70 so that the capstan will rotate through a one pin stop as an escapement wheel in the drive unit rotates through a one tooth stop. A plurality of peripheral grooves 76 are spaced laterally apart on the capstan at distances corresponding to the conventional spacing between the data perforations 77 of the different channels of a perforated tape. As illustrated, the capstan 70 has 8 grooves 76 to enable an 8-channel tape to be handled.

The read head unit 10 comprises a base plate 100 secured to panel 12 by the pivot bushing 101, the latter having a portion thereof threaded to engage panel 12. The bushing 101 extends through an eccentrically bored member 102 so that the position of the base plate 100 may be adjusted relative to panel 12.

An adjustment screw 103, threaded vertically through the base plate 100, abuts the stop member 104 to limit counterclockwise rotation of the base plate 100 about the pivot bushing 102. Stop member 104 is rigidly secured to panel 12 by screws 105.

A lifting lever 106, pivotally secured to panel 12 by an eccentrically bored pivot nut 107 and bolt 108, is provided with a pin 109 thereon receivable in slot 110 of base plate 100. As lifting lever 106 is rotated counterclockwise about bolt 108, pin 109 and slot 110 will cause the base plate 100 to pivot in a clockwise direction about bushing 101. The base plate 100 will be moved in a reverse direction by moving the lifting lever handle 111 downwardly. The pin 109 has an over center action in slot 110 to lock the base plate 100 against accidental movement when the lifting lever handle 111 is in its downwardmost position and the adjustment screw 103 is in abutment with the stop member 104.

The end of base plate 100 away from the pivot bushing 102 has an arm 114 thereon extending away from panel 12. A fixed contact assembly 115 is secured to arm 114 and comprises a plastic block 116 having a plurality of sets of contacts embedded therein, with a set of two contacts 117 and 118 being provided adjacent each groove 76 on capstan 70.

The contacts 117 and 118 have their contact surfaces spaced vertically from each other to allow the vertically movable contact 120 to move between alternate electrical engagements with the fixed contacts. As such, the contacts form a switch having two fixed contacts and a movable switch member movable into alternate engagement with the fixed contacts. An insulating member secured to block 116 has fins 121 extending between each set of contacts to provide electrical isolation therebetween.

The movable contacts 120 are embedded in a plastic block 123 and project therethrough to form terminals 124. The plastic block 123 is secured by suitable means to bracket 125 which in turn is fastened to base plate 12. The movable contacts 120 are preferably formed from flat groups of resilient electrical contact wire.

Figure 6:
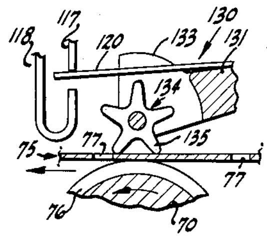
FIGS. 6 through 9 are schematic views of the tape perforation sensing wheels, illustrating the operation thereof.

Also secured to bracket 125, for pivotal movement relative thereto, are a plurality of star wheel sensing devices 130, one device being provided for each capstan groove 76. As best seen in FIGS. 1 and 6, each sensing device comprises a holder 131, pivotally mounted at one end to bracket 125 by pin 132 and having spaced apart ears 133 at its other end. A star wheel 134 is mounted on and between ears 133 for rotation about an axis parallel to the capstan axis and has a plurality of points 135 thereon adapted to pass through tape data perforations 77 into the capstan grooves 76. The radial points 135 are spaced apart from one another by a distance approximately equal to the distance between adjacent sprocket holes 73 of tape 75.

The movable contacts 120 engage the upper surface of the holders 131 and are stressed to bias the star wheels downwardly, the downward movement thereof being limited by the engagement of the holders 131 with the guide plate 136 secured to bracket 125. The movable contacts 120 lie between the ears 133 of the holders to prevent lateral movement between the contacts 120 and the star wheels.

The movable contact terminals 124 and the fixed contacts 117 and 118 each has suitable wires (not shown) connected thereto, which wires are passed through the bore of the pivot bushing 102 to behind the panel 12, from where they may extend to any desired point.

In the circuit shown in FIG. 10, all of the movable contact terminals 124 are connected together and are connected to the "Reverse" and "Forward" contacts of the switch 140, this switch being ganged to switch 66 for movement therewith. Thus, whenever the switch 66 is moved to the "Reverse" or "Forward" positions, the pulses from the pulse generator 65 will be applied to the movable contacts 120 of the read head unit 10.

In the operation of the device, the switches 66 and 140 are moved to the "Stop" position, to prevent any pulses from the pulse generator 65 from rotating the capstan 70 or from energizing the movable contacts 120. The lifting lever handle 111 is raised to pivot the base plate 100 and the star wheel sensing devices carried thereby away from capstan 70. A perforated data tape 75 is then placed on the capstan, with the sprocket pins 72 engaged in the tape sprocket holes 73. The lifting lever handle is then returned to its down position, locking the base plate against movement relative to capstan 70.

Figure 7:
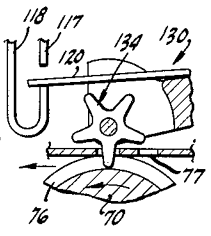

Each one of the star wheels 134 will now rest upon the surface of the tape, as illustrated in FIGS. 6 and 7. If there is no data hole directly underneath a star wheel, the wheel will rest on the surface of the tape as shown in FIG. 6 and the movable contact 120 will be in engagement with the upper fixed contact 117. If there is a data hole directly underneath a star wheel, then gravity and the resilient bias of the contacts 120 will force a star wheel point 135 down through the hole, as illustrated in FIG. 7, and the movable contact will be in engagement with the lower fixed contact 118.

As will be noted in FIG. 6, the movable contact 120 will remain in engagement with contact 117 until the tape 75 moves sufficiently far to move a perforation 77 under the star wheel 134, at which time the downward pressure on the star wheel will cause the rearmost star point 135 to move downwardly into the perforation and will allow the movable contact 120 to move downwardly into engagement with fixed contact 118. Thus, if the tape moves from a no-hole position to a no-hole position, no switching will take place; if the tape moves from a no-hole position to a hole position, the switching will occur.

Figure 8:
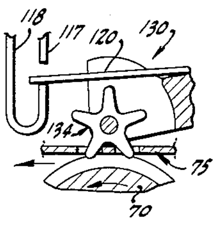
Figure 9:
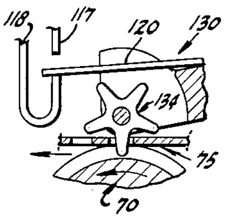

Similarly, no switching will occur if the tape moves from a hole position to a hole position, as illustrated in FIGS. 7, 8 and 9. In FIG. 7, the tape 75 is in a hole position, with a point of the start wheel projecting down through data hole 77 into capstan groove 76 and with the movable contact 120 being in engagement with the lower fixed contact 118. Assume now that the tape is to be advanced to the left one step. The tape will begin to move, but due to the slop fit of the star wheel points in the data holes 77, the star wheel will not begin to rotate until the trailing edge of the data hole engages the star wheel point therein. This engagement rotates the wheel allowing the next star wheel point to ride down into the next data hole, FIG. 8. The step is complete in FIG. 9, with the next data hole now directly under the star wheel. In the movement of the tape from FIG. 7 to FIG. 9, the axis of the star wheel remains fixed and the contacts 120 and 118 remain in engagement. The same results would occur if the tape were moved backwardly to the right in FIGS. 7–9.

In the event that the tape moves from a hole position to a no-hole position, when the star wheel will be forced upwardly to ride upon the top of the tape as illustrated in FIG. 6, causing the movable contact 120 to move from contact 118 to contact 117.

From the above, it may be seen that no switching will occur during tape movement unless there is a change in a data channel, either from hole to no-hole, or from no-hole to hole.

Figure 11:
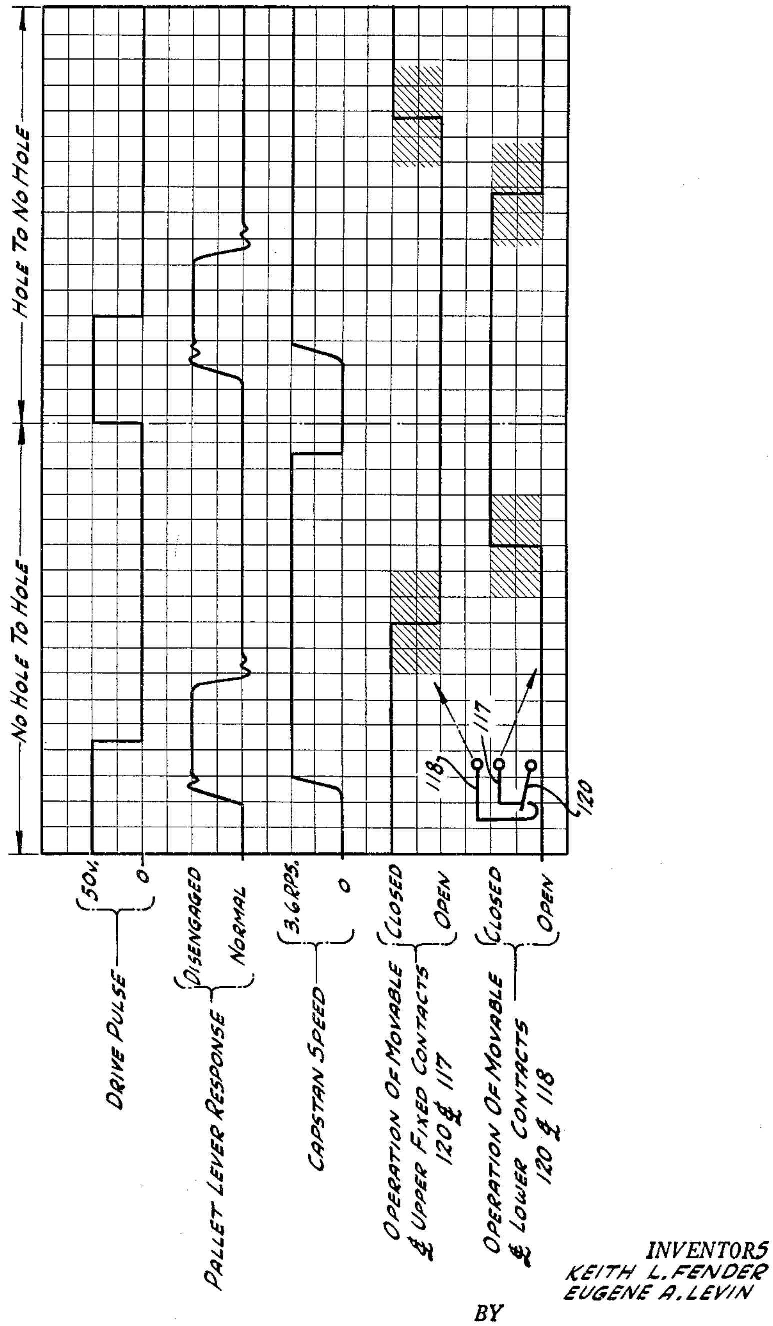
FIG. 11 is a timing chart, showing the sequential operation of the various components of the invention.

The timing chart in FIG. 11 illustrates the operation of the elements shown schematically in FIG. 10. The top line of FIG. 11 indicates the operation of the pulse generator 65 which produces 50-volt pulses of approximately 4.5 milliseconds duration, at a constant or random rate. The rate is such that there is at least about 16.7 milliseconds between leading edges of any two consecutive pulses.

These pulses, when applied to one of the magnets 41 or 43, will cause the pallet lever associated therewith to move from engaged to disengaged positions and back again in the time indicated in line 2 of FIG. 11. The drive shaft, and capstan thereon, will move through a one tooth rotation by the released friction drive previously described, in the time indicated in line 3 of FIG. 11.

Line 4 of FIG. 11 indicates the timed operation of the contacts 120 and 117 which are used to sense a no-hole indication, and line 5 indicates the time relation of the operation of the contacts 120 and 118 which are used to sense a hole indication. Assume that the tape 75 is at a no-hole position relative to a given star wheel, and that the tape has a data hole in its next position. A pulse is then applied to a magnet 41 to advance the tape one step. The mechanical delay in the operation of the pallet lever will prevent the capstan from rotation until shortly before the end of the energizing pulse. The capstan will then rotate through a portion of its one step advance to move the data hole to the star wheel to allow the star wheel to move downwardly into the hole. The average length of time from the beginning of the energizing pulse to the opening of contacts 120 and 117 is approximately 9 milliseconds, which is well after the end of the energizing pulse.

The data holes may vary slightly in size and spacing relative to the sprocket holes, and the shaded portion of line 4 of FIG. 11 represents the range in time of the opening of contacts 117 and 120 due to these mechanical tolerances.

The time required for the movable contact 120 to move from contact 117 to contact 118 is about 3 milliseconds, as indicated in line 5 of FIG. 11, with a time range being shown corresponding to the range in line 4.

The opening of contacts 120 and 117 and the closing of contacts 120 and 118 both occur well after the energizing pulse has ended, and well before the end of a one step rotation of the capstan.

In similar manner, the contacts 120 and 118 will open and the contacts 120 and 117 will close after an energizing pulse and before the end of a one step rotation of the capstan, when the tape moves from a hole to a no-hole indication. In this case, the time delay between tape movement and switch operation is due to the slop fit of the star wheel points in the data holes. Thus, the tape has to move a slight distance before the trailing edge of the data hole begins to cam the star wheel upwardly.

The significance of the above described switch operation is that the same pulses may be used to read the tape as are used to advance the tape, insuring complete synchronism between tape movement and tape reading, but switching will never occur when a circuit is energized. As may be appreciated, the movable contacts 118 must be quite light and small and are highly susceptible to damage by arcing, so that it is highly important that all switching be done on non-energized circuits.

As has been described above, the capstan will come to rest following a one step rotation thereof, and the tape carried thereby will be moved to its next position, and will be at rest awaiting the next interrogating pulse. Thus, the tape is always ready to be instantly interrogated by the pulse from the pulse generator, which pulse then causes the tape to be moved to its next position, after interrogation.

The star wheels are symmetrical in that they will work equally well for either direction of tape travel. Accordingly, readings may be made in the same manner as above described whether the tape is moving forwardly, backwardly, or alternately in direction.

Another advantage of the present device is that positive readings can be made at a single pulse time of both the true and complement values of the data punched into the tape. Thus, the fixed contacts 118 may all be connected to a computer or similar device to read and deliver the pulses corresponding to the true value of the punched data, and the fixed contacts 117 may all be connected to the computer to deliver pulses corresponding to the complement value of the punched data.

Although the present invention has been disclosed as being used with punched tape, it is obvious that the device can be used with punched cards to give data readings thereof. Also, even though the invention has been described for use with perforated tape having standard spacings between data channels, it is obvious that the capstan grooves 76 and sensing switches could be spaced in accordance with any other desired data channel configuration.

It is to be further realized that the device illustrated and described is merely a preferred embodiment of the invention, and that various changes in the shape, size, arrangement, speed and timing of the parts may be resorted to without departing from the spirit of the invention or the scope of the attached claims.

Having thus described our invention, what we claim and desire to secure by Letters Patent is:

1. A perforated data reader for use with cards or tape having a row of sprocket holes and a row of data perforations parallel thereto, said reader comprising a cylindrical capstan having a plurality of sprocket pins spaced peripherally therearound and a peripheral groove therein, said pins and groove being spaced from one another in correspondence with the spacing between said rows of sprocket holes and data perforations, pulse-operated means for rotating said capstan through a single pin advance in a desired direction of rotation in a predetermined length of time $t_1$ upon energization of said pulse-operated means by an electrical pulse of a duration $t_2$, a perforation sensing means disposed adjacent said groove and movable through a data perforation into said groove, a switch having a fixed contact and a movable member, means operatively associated with said sensing means for moving said movable switch member into engagement with said contact at a time interval $t_3$ after an energization of said pulse-operated means when said sensing element is moved through a data perforation into said groove and for moving said switch member out of engagement with said contact at a time interval $t_3$ after an energization of said pulse-operated means when said sensing element is moved from said groove, and electrical circuit means for applying an electrical pulse of $t_2$ duration simultaneously to said pulse-operated means and to said movable switch member, and wherein $t_2 < t_3 < t_1$.

2. A perforated data reader as set forth in claim 1 wherein the sensing means comprises a star wheel mounted for free rotation about an axis parallel to the axis of said capstan, said star wheel having a plurality of radial points thereon spaced apart from one another by a distance approximately equal to the distance between adjacent sprocket pins, said points having a relatively sloppy fit within said data perforations.

3. A perforated data reader for use with cards or tape having a row of sprocket holes and a row of data perforations parallel thereto, said reader comprising a cylindrical capstan having a plurality of sprocket pins spaced peripherally therearound and a peripheral groove therein, said pins and groove being spaced from one another in correspondence with the spacing between said rows of sprocket holes and data perforations, pulse-operated means for rotating said capstan through a single pin advance in a desired direction of rotation in a predetermined length of time $t_1$ upon energization of said pulse-operated means by an electrical pulse of time duration $t_2$, a pulse generator means for producing electrical pulses of $t_2$ duration with a minimum length of time $t_3$ between the leading edges of consecutive pulses, a perforation sensing means disposed adjacent said groove and movable through a data perforation into said groove, a switch having a fixed contact and a movable member, means operatively associated with said sensing means for moving said movable switch member into engagement with said contact at a time interval $t_4$ after the energization of said pulse-operated means when said sensing element is moved through a data perforation into said groove and for moving said switch member out of engagement with said contact at a time interval $t_4$ after the energization of said pulse-operated means when said sensing element is moved from said groove, electrical circuit means connecting said pulse-operated means and said movable switch member to said pulse generator means, and wherein $t_2 < t_4 < t_1 < t_3$.

4. A perforated data reader as set forth in claim 3 wherein the sensing member comprises a star wheel mounted for free rotation about an axis parallel to the axis of said capstan, said star wheel having a plurality of radial points thereon spaced apart from one another by a distance approximately equal to the distance between adjacent sprocket pins, said points having a relatively sloppy fit within said data perforations.

References Cited in the file of this patent

UNITED STATES PATENTS

| | | |
|---|---|---|
| 888,808 | Hutches | May 26, 1908 |
| 1,632,298 | Kleinschmidt | June 14, 1927 |
| 1,711,497 | Hiltz et al. | May 7, 1929 |
| 1,910,586 | Bartholomew et al. | May 23, 1933 |
| 2,345,289 | Reiber | Mar. 28, 1944 |
| 2,517,984 | Cunningham | Aug. 8, 1950 |
| 2,724,014 | Edgar | Nov. 15, 1955 |
| 2,843,319 | Deutsch | July 15, 1958 |